(12) United States Patent
Zhang

(10) Patent No.: US 11,919,428 B2
(45) Date of Patent: Mar. 5, 2024

(54) OCCUPANT SUPPORTING DEVICE AND ITS TEMPERATURE MANAGEMENT SYSTEM

(71) Applicant: GENTHERM AUTOMOTIVE SYSTEMS (CHINA) LTD., Hebei (CN)

(72) Inventor: Jonathan Yu Zhang, Tianjin (CN)

(73) Assignee: GENTHERM AUTOMOTIVE SYSTEMS (CHINA) LTD., Hebei (CN)

( * ) Notice: Subject to any disclaimer, the term of this patent is extended or adjusted under 35 U.S.C. 154(b) by 415 days.

(21) Appl. No.: 16/096,485

(22) PCT Filed: Apr. 28, 2016

(86) PCT No.: PCT/CN2016/080477
§ 371 (c)(1),
(2) Date: Oct. 25, 2018

(87) PCT Pub. No.: WO2017/185284
PCT Pub. Date: Nov. 2, 2017

(65) Prior Publication Data
US 2019/0135145 A1 May 9, 2019

(51) Int. Cl.
*B60N 2/56* (2006.01)
*F25B 21/04* (2006.01)
(Continued)

(52) U.S. Cl.
CPC ............. *B60N 2/5621* (2013.01); *B60N 2/56* (2013.01); *B60N 2/5678* (2013.01); *F25B 21/04* (2013.01); *B60N 3/008* (2013.01); *B64D 11/0626* (2014.12)

(58) Field of Classification Search
CPC ......... F25B 21/04; B60N 2/56; B60N 2/5621; B60N 2/5678; B60N 3/008; B64D 11/0626; F24H 9/0063; F24H 9/0073
See application file for complete search history.

(56) References Cited

U.S. PATENT DOCUMENTS 1,370,832 A 3/1921 Mollberg
1,439,681 A 12/1922 Alkire et al.
(Continued)

FOREIGN PATENT DOCUMENTS

CN 1158655 A 9/1997
CN 200974487 Y 9/2007
(Continued)

OTHER PUBLICATIONS

International Search Report from the Chinese Patent Office for Application No. PCT/CN2016/080477 dated Jan. 18, 2017.
(Continued)

*Primary Examiner* — Frantz F Jules
*Assistant Examiner* — Webeshet Mengesha
(74) *Attorney, Agent, or Firm* — The Dobrusin Law Firm, P.C.

(57) ABSTRACT

A temperature management system for an occupant supporting device comprising an air-circulating circuit is provided, the air-circulating circuit comprising: an air distributing device; a main power device for circulating the air in the air-circulating circuit; and a temperature adjusting device for adjusting the temperature of the air in the air-circulating circuit, wherein an airflow, which has been temperature adjusted by the temperature adjusting device, out of the main power device comprises at least a first portion which flows into the air distributing device and a second portion which returns back to the main power device after circulating within the air-circulating circuit, and wherein the airflow which returns back to the main power device will be adjusted by the temperature adjusting device and circulated in the air-circulating circuit again. A seat cushion and a seat backrest comprising the temperature management system, and an occupant supporting device comprising the seat
(Continued)

cushion and the seat backrest are also provided. The occupant supporting device can be a seat or a bed.

23 Claims, 10 Drawing Sheets

(51) Int. Cl.
  *B60N 3/00* (2006.01)
  *B64D 11/06* (2006.01)

(56) References Cited

U.S. PATENT DOCUMENTS

| | | | |
|---|---|---|---|
| 1,514,329 | A | 11/1924 | Metcalf |
| 2,022,959 | A | 12/1935 | Gordon |
| 2,158,801 | A | 5/1939 | Petterson |
| 2,703,134 | A | 3/1955 | Mossor |
| 2,758,532 | A | 8/1956 | Awe |
| 2,791,956 | A | 5/1957 | Guest |
| 2,826,135 | A | 3/1958 | Benzick |
| 2,992,604 | A | 7/1961 | Trotman et al. |
| 2,992,605 | A | 7/1961 | Trotman et al. |
| 3,030,145 | A | 4/1962 | Kottemann |
| 3,101,037 | A | 8/1963 | Taylor |
| 3,101,660 | A | 8/1963 | Taylor |
| 3,127,931 | A | 4/1964 | Johnson |
| 3,131,967 | A | 5/1964 | Spaulding |
| 3,162,489 | A | 12/1964 | Trotman |
| 3,529,310 | A | 9/1970 | Olmo |
| 3,653,590 | A | 4/1972 | Elsea |
| 3,684,170 | A | 8/1972 | Roof |
| 4,043,544 | A | 8/1977 | Ismer |
| 4,072,344 | A | 2/1978 | Li |
| 4,509,792 | A | 4/1985 | Wang |
| 4,589,656 | A | 5/1986 | Baldwin |
| 4,777,802 | A | 10/1988 | Feher |
| 5,160,517 | A | 11/1992 | Hicks et al. |
| 5,626,021 | A * | 5/1997 | Karunasiri ............... A47C 7/74 236/49.3 |
| 6,068,332 | A | 5/2000 | Faust et al. |
| 6,164,719 | A | 12/2000 | Rauh |
| 6,189,966 | B1 | 2/2001 | Faust et al. |
| 6,626,488 | B2 * | 9/2003 | Pfahler ................. A47C 7/744 297/180.12 |
| 10,160,356 | B2 | 12/2018 | Lofy et al. |
| 2005/0066505 | A1 | 3/2005 | Iqbal et al. |
| 2005/0067862 | A1 | 3/2005 | Iqbal et al. |
| 2005/0093347 | A1 | 5/2005 | Bajic et al. |
| 2006/0138810 | A1 | 6/2006 | Knoll et al. |
| 2006/0138811 | A1 * | 6/2006 | Pfahler ................. B60N 2/5635 297/180.14 |
| 2006/0272337 | A1 | 12/2006 | Ito et al. |
| 2007/0101729 | A1 * | 5/2007 | Aoki ..................... B60N 2/5657 62/3.61 |
| 2007/0158994 | A1 * | 7/2007 | Brennan ............... B60N 2/5635 297/452.43 |
| 2007/0209369 | A1 | 9/2007 | Ito et al. |
| 2007/0277313 | A1 * | 12/2007 | Terech .................... A47C 7/74 165/138 |
| 2012/0144844 | A1 * | 6/2012 | Park ..................... B60N 2/5657 62/3.3 |
| 2013/0097777 | A1 * | 4/2013 | Marquette .............. A47C 7/74 5/423 |
| 2013/0299128 | A1 * | 11/2013 | Bergamini ......... B60H 1/00207 165/59 |
| 2014/0305625 | A1 * | 10/2014 | Petrovski ........... B60H 1/00478 165/203 |
| 2015/0210193 | A1 | 7/2015 | Kurosawa et al. |
| 2015/0274049 | A1 * | 10/2015 | Langensiepen ...... B60N 2/5642 297/180.12 |
| 2016/0009206 | A1 | 1/2016 | Perraut et al. |
| 2016/0320104 | A1 | 11/2016 | Lofy |
| 2016/0332549 | A1 | 11/2016 | Marquette et al. |
| 2017/0028886 | A1 * | 2/2017 | Zhang ................. B60N 2/5657 |
| 2018/0208090 | A1 | 7/2018 | Wolas |

FOREIGN PATENT DOCUMENTS

| | | |
|---|---|---|
| CN | 102555869 A | 7/2012 |
| CN | 203093809 U | 7/2013 |
| CN | 104507750 A | 4/2015 |
| CN | 204236294 * | 4/2015 |
| CN | 204236294 U | 4/2015 |
| CN | 204749922 U | 11/2015 |
| CN | 105270135 A | 1/2016 |
| CN | 105291920 A | 2/2016 |
| CN | 105599652 A | 5/2016 |
| CN | 105142977 A | 12/2016 |
| DE | 3705756 | 10/1988 |
| DE | 29904238 U1 | 6/1999 |
| DE | 10144839 | 3/2003 |
| DE | 10350148 B3 | 2/2005 |
| DE | 102009038311 A1 | 2/2011 |
| EP | 0280213 | 8/1988 |
| EP | 1266794 | 12/2002 |
| EP | 1323573 | 7/2003 |
| WO | 96/05475 | 2/1996 |
| WO | 02/053410 | 7/2002 |
| WO | 05/021320 | 3/2005 |
| WO | 2006/087134 A1 | 8/2006 |

OTHER PUBLICATIONS

International Preliminary Report on Patentability for Application No. PCT/CN2016/080477 dated Oct. 30, 2018.
Excerpt from website http://www.seatcomfort.com/ventilation.htm, Specializing in Seat Ventilation and Heating Systems, Ventilation.
GMT 830 Heating & Ventilation System, IGB Automotive Ltd., received by Assignee W.E.T. Automotive Systems, Jun. 2003.
Specializing in Seat Ventilation and Heating Systems, Seat Comfort Systems, http://www.seatcomfort.comsemashow1.htm, Jun. 10, 2003.
First Chinese Office Action for Chinese Application 201680082472.3 dated Jul. 9, 2020.

\* cited by examiner

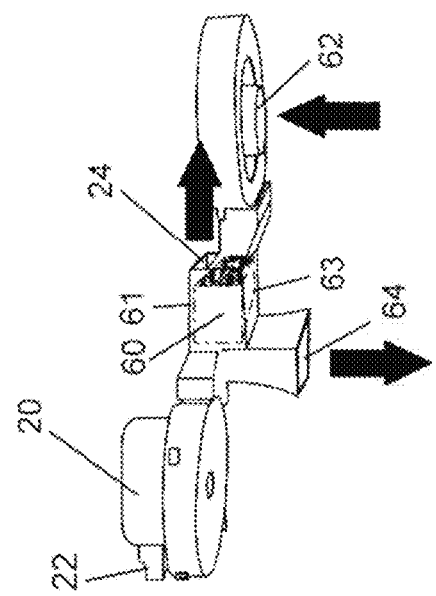
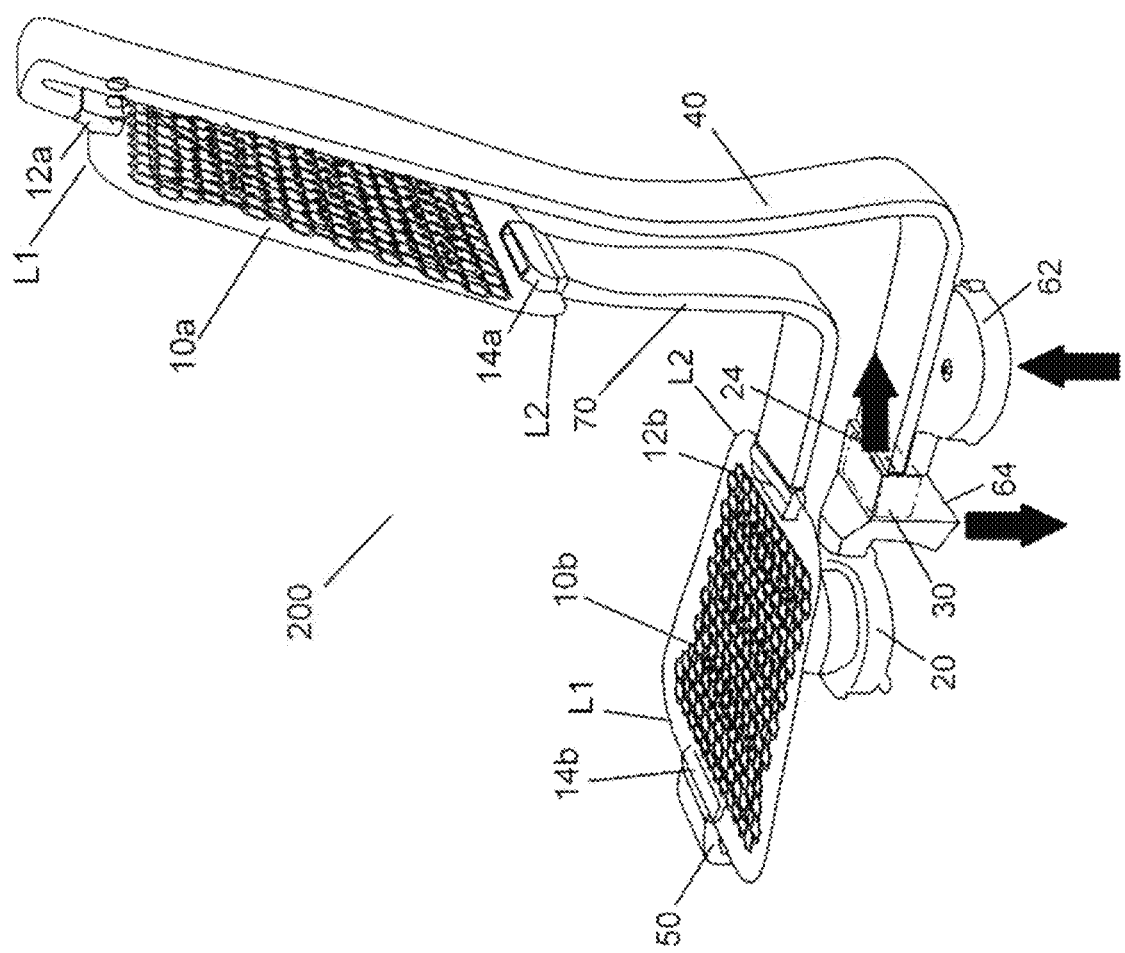

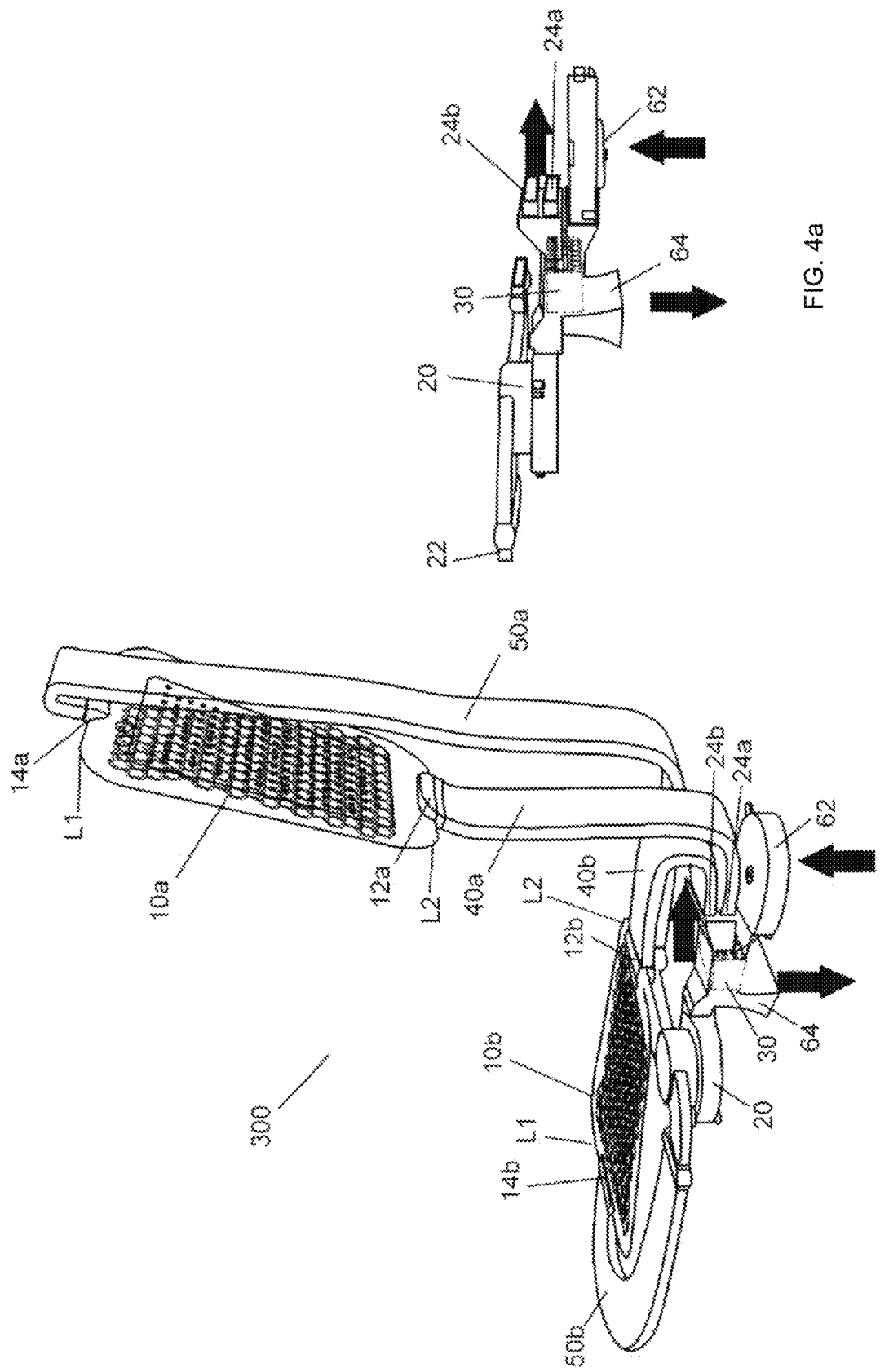

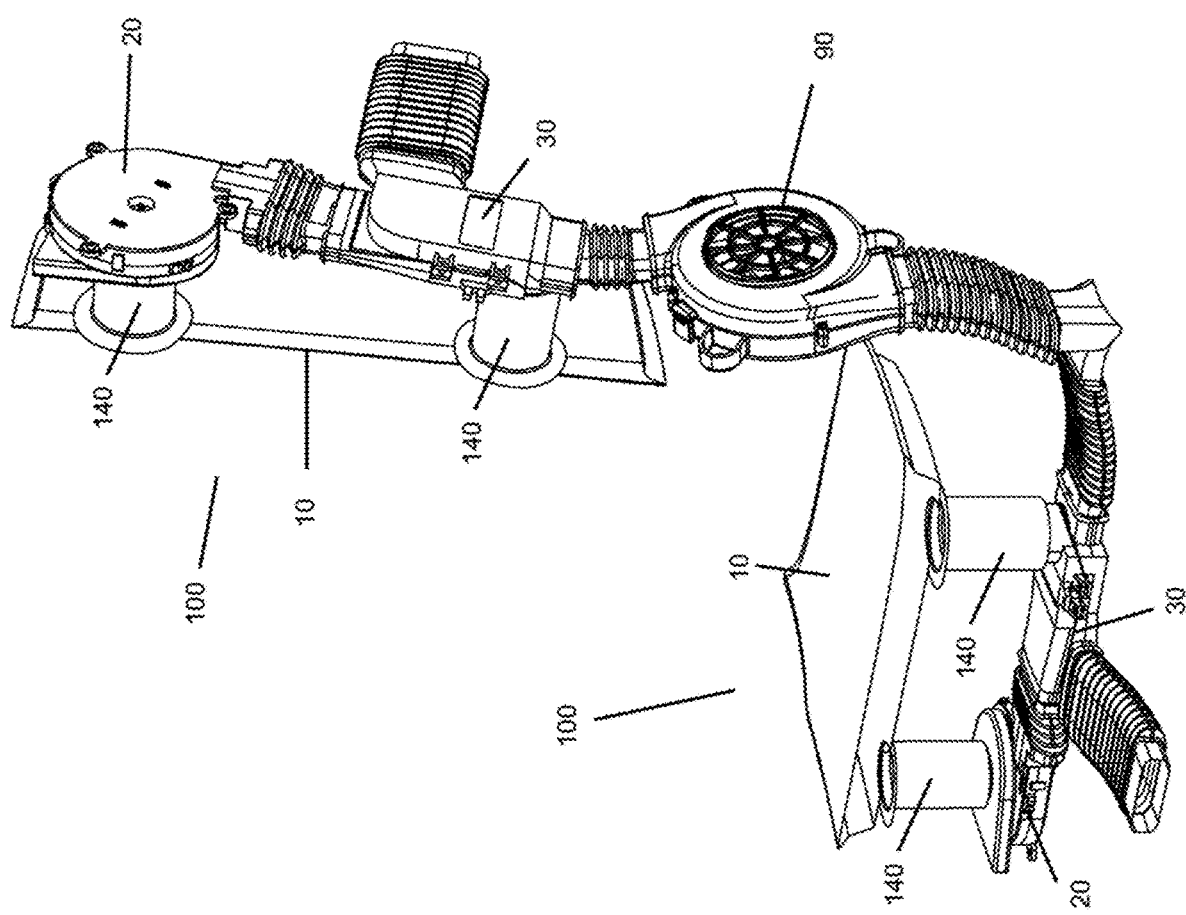

OCCUPANT SUPPORTING DEVICE AND ITS TEMPERATURE MANAGEMENT SYSTEM

TECHNICAL FIELD

The invention generally relates to a temperature management system for an occupant supporting device and an occupant supporting device comprising such a temperature management system. In particular, the temperature management system comprises a closed loop or semi-closed loop air-circulating circuit. The occupant supporting device can be used in transportation vehicles such as motor vehicles or planes, and in particular, the occupant supporting device can be a seat or a bed.

BACKGROUND ART

In order to adjust the temperature of a side of an occupant supporting device such as a vehicle seat so as to provide a cool or warm environment for an occupant seating on the seat in summer or in winter, usually a temperature management system is configured in a cushion and/or a backrest of the seat.

In general, the temperature management system of the vehicle seat is of open type, and comprises a suction means for suctioning ambient air into the temperature management system where the air is heated or cooled. The heated/cooled air heats or cools the cushion and/or the backrest of the seat and then is expelled outside from the temperature management system.

However, with this temperature adjusting manner, it is the ambient air which is suctioned into and used by the temperature management system, which results in a large energy consumption required for heating/cooling the air during the air circulation, a low warming/cooling speed of the seat and a great noise, and thus causes uncomfortableness to the occupant.

It is therefore desired to provide an occupant supporting device with an improved temperature management system to overcome the above drawbacks.

SUMMARY OF THE INVENTION

The invention provides an occupant supporting device comprising a closed loop or semi-closed loop temperature management system, in which temperature management system, air circulating within the temperature management system has no or a little air-exchange with outside air, which can warm or cool a space around a seat rapidly.

To this end, according to a first aspect of the invention, a temperature management system for an occupant supporting device comprising an air-circulating circuit is provided, the air-circulating circuit comprising: an air distributing device; a main power device for circulating the air in the air-circulating circuit; and a temperature adjusting device for adjusting the temperature of the air in the air-circulating circuit, wherein an airflow, which has been temperature adjusted by the temperature adjusting device and which flows out of the main power device, comprises at least a first portion which flows into the air distributing device and a second portion which returns back to the main power device after circulating within the air-circulating circuit, and wherein the airflow which has returned back to the main power device will be adjusted by the temperature adjusting device and circulated in the air-circulating circuit again.

According to a feasible embodiment, the first portion which flows into the air distributing device, partially or entirely, will not return back to the main power device.

According to a feasible embodiment, the second portion which flows out of an air outlet of the main power device directly returns back to an air inlet of the main power device.

According to a feasible embodiment, the first portion comprises an entirety of the airflow which has been temperature adjusted by the temperature adjusting device and which flows out of the main power device, the second portion is a portion of or an entirety of the first portion, and at least a portion of or an entirety of the airflow flowing out of the air distributing device returns back to the main power device.

According to a feasible embodiment, the air distributing device comprises small air holes at a side proximate to an occupant seating on the occupant supporting device, the small air holes being in communication with outside air.

According to a feasible embodiment, an outlet duct communicating the air distributing device with the main power device also comprise air holes for allowing the air within the air-circulating circuit to be air-exchanged with outside air.

According to a feasible embodiment, the temperature adjusting device is provided at an air outlet of the main power device, and the airflow in the temperature management system flows out of the main power device after its temperature has been adjusted.

According to a feasible embodiment, the temperature adjusting device is a thermoelectrical device disposed in the air-circulating circuit.

According to a feasible embodiment, the temperature management system further comprises a ventilation path for the thermoelectrical device, wherein the ventilation path comprises an air inlet and an air outlet which are provided at a side of the air distributing device away from an occupant seating on the occupant supporting device and which are in communication with outside air, and the ventilation path further comprises an additional power device.

According to a feasible embodiment, the main power device and the additional power device are separate power devices which have the same or different structure.

According to a feasible embodiment, the main power device and the additional power device are provided by a single common power device.

According to a feasible embodiment, the temperature adjusting device comprises a further heating element as an alternative or in addition to the thermoelectrical device.

According to a feasible embodiment, the further heating element is disposed within or along a ventilation layer beneath a spacer of the air distributing device.

According to a feasible embodiment, the ventilation layer is in the form of a bag.

According to a feasible embodiment, the further heating element is at least partially made of textile or printed foil.

According to a feasible embodiment, the side of the air distributing device facing towards an occupant seating on the occupant supporting device is attached to a mat which is in direct contact with the occupant.

According to a feasible embodiment, the side of the air distributing device facing towards an occupant seating on the occupant supporting device is configured as a mat layer which is in direct contact with the occupant.

According to a feasible embodiment, the air distributing device further comprises a spacer layer in direct contact with the mat layer, a heater layer in direct contact with the spacer layer, and a bottom PU layer in direct contact with the heater layer.

According to a feasible embodiment, the spacer layer, the heater layer, and the bottom PU layer are sewed to the mat layer in a hermetic manner.

According to a feasible embodiment, the bottom PU layer is hermetically engaged to a foam layer of the occupant supporting device.

According to a feasible embodiment, the bottom PU layer is hermetically engaged to the foam layer by means of a seal with adhesive at its opposite sides.

According to a feasible embodiment, the air distributing device comprises an air inlet and an air outlet which are disposed at opposite ends in a longitudinal direction of the air distributing device or at the same end in the longitudinal direction.

According to a feasible embodiment, the air distributing device is communicated with the power device via an air passage passing through the foam of the occupant supporting device.

According to a feasible embodiment, the air distributing device only comprises a first air distributing device.

According to a feasible embodiment, the air distributing device comprises first and second air distributing devices, and wherein the first portion flows into the first and second air distributing devices from the main power device and returns back to the main power device after flowing out of the first and second air distributing devices.

According to a feasible embodiment, the second air distributing device is connected with the first air distributing device in series, and wherein the first portion flows into the first air distributing device from the main power device, the airflow flowing out of the first air distributing device flows into the second air distributing device, and the airflow flowing out of the second air distributing device returns back to the main power device.

According to a feasible embodiment, the airflow flowing out of the first air distributing device flows into the second air distributing device partially or entirely.

According to a feasible embodiment, the second air distributing device is connected with the first air distributing device in parallel, and wherein the first portion flows into the first and second air distributing devices at the same time from the main power device, and the airflow flowing out of both the first and second air distributing devices directly returns back to the main power device.

According to a feasible embodiment, a first outlet duct from an air outlet of the first air distributing device and a second outlet duct from an air outlet of the second air distributing device are in direct communication with the main power device independently, or a first outlet duct from an air outlet of the first air distributing device and a second outlet duct from an air outlet of the second air distributing device are integrated into a single overall outlet duct which is in direct communication with the main power device.

According to a second aspect of the invention, a seat cushion comprising a temperature management system with only one air distributing device is provided.

According to a third aspect of the invention, a seat backrest comprising a temperature management system with only one air distributing device is provided.

According to a fourth aspect of the invention, an occupant supporting device comprising the temperature management system as above is provided.

According to a fifth aspect of the invention, an occupant supporting device comprising one or both of the seat cushion and the seat backrest is provided.

In the condition that the occupant supporting device comprises both the seat cushion and the seat backrest, wherein the additional power device in the seat cushion and the additional power device in the seat backrest are provided by a single common power device.

In the condition that the occupant supporting device comprises both the seat cushion and the seat backrest, wherein the main power device and the additional power device in the seat cushion and the main power device and the additional power device in the seat backrest are provided by a single common power device.

According to a sixth aspect of the invention, an occupant supporting device is provided which comprises: a seat backrest comprising a temperature management system with only one air distributing device, and a seat cushion comprising an open temperature management system, wherein the open temperature management system comprises an air distributing device and a power device which is configured for supplying ambient air into an air inlet of the air distributing device, the air distributing device comprising an air outlet open to ambient environment.

According to a seventh aspect of the invention, an occupant supporting device comprising a temperature management system with two air distributing devices is provided.

The occupant supporting device according to the invention can be a seat or a bed.

A temperature management system for an occupant supporting device comprising an air-circulating circuit is also provided, the air-circulating circuit comprising: a main power device for circulating the air in the air-circulating circuit; a temperature adjusting device for adjusting the temperature of the air in the air-circulating circuit, and an air distributing device forming a closed fluid loop, wherein an airflow, which flows out of the main power device and which has been temperature adjusted by the temperature adjusting device, flows into the air distributing device and returns back to the main power device after circulating within the air-circulating circuit, and wherein the airflow which has returned back to the main power device will be adjusted by the temperature adjusting device and circulated in the air-circulating circuit again, and wherein the temperature management system comprises an additional power device, which is installed for providing an auxiliary second air stream along the temperature adjusting device outside of the closed loop, so that the auxiliary air stream allows the temperature adjusting device to work as a heat pump, which transfers heat from the closed fluid loop towards the auxiliary air stream or vice versa.

With the occupant supporting device according to the invention comprising a closed loop or semi-closed loop temperature management system, the space around the seat can be warmed or cooled in a high speed, achieving a better warming or cooling effect, i.e. obtaining a higher temperature when heating and a lower temperature when cooling.

BRIEF DESCRIPTION OF THE DRAWINGS

The above and other features and advantages of the invention will be better understood from the description of preferred embodiments of the invention in conjunction with the drawings in which:

FIG. 3 is a perspective view of the temperature management system constructed according to the second embodiment of the invention with two air distributing layers, the two air distributing layers being connected with each other in series;

FIG. 3a is another perspective view of the temperature management system of FIG. 3 with the air distributing layers and air ducts removed;

FIG. 4 is a perspective view of the temperature management system constructed according to the third embodiment of the invention with two air distributing layers, the two air distributing layers being connected with each other in parallel;

FIG. 4a is another perspective view of the temperature management system of FIG. 4 with the air distributing layers and air ducts removed;

FIG. 10 shows a further embodiment of a temperature management system according to the invention.

DETAILED DESCRIPTION OF PREFERRED EMBODIMENTS

Occupant supporting devices according to the invention can be used in, but not limited to, transportation vehicles, such as motor vehicles or planes, and in particular, can be configured as seats and beds in the vehicles or planes.

A temperature management system in the occupant supporting device according to the invention comprises an air-circulating circuit in a closed loop or semi-closed loop design, in which air flowing within the circulating circuit is not air-exchanged with outside or only a slight air-exchange occurs, which will not significantly influence adversely the speed and effect of the temperature management system heats or cools the space around the occupant supporting device.

In the context, the temperature management system constructed according to a preferred embodiment will be described with regard to a seat as an example.

A temperature management system according to the invention generally comprises: an air distributing layer which can be a mattress, a cushion or a backrest in direct contact with an occupant and which is usually made of foam or similar material; a power device (also referred to as a "main power device") for driving airflow to circulate within the air-circulating circuit of the temperature management system, the power device generally being configured as a fan, a blower or a similar device; a temperature adjusting device for adjusting the temperature of the air in the air-circulating circuit of the temperature management system, which can be configured as any device suitable for heating and/or cooling the air, such as a heater or cooler, or which can be configured as a thermoelectrical device which can not only heat the air but also cool the air. In the context, the term "temperature adjusting" means to increase or decrease the temperature of the air in the air-circulating circuit of the temperature management system, i.e. heating and/or cooling the air.

According to the principle of the invention, the air within the air-circulating circuit of the temperature management system is heated and/or cooled by the temperature adjusting device, is driven by the power device to flow out of its air outlet, flows into the air distributing layer via an inlet duct and an air inlet of the air distributing layer to warm/cool the occupant on the seat, flows out of an air outlet of the air distributing layer, returns back to an air inlet of the power device via an outlet duct, and again is heated and/or cooled by the temperature adjusting device, so the process is repeated.

Figure 1C:
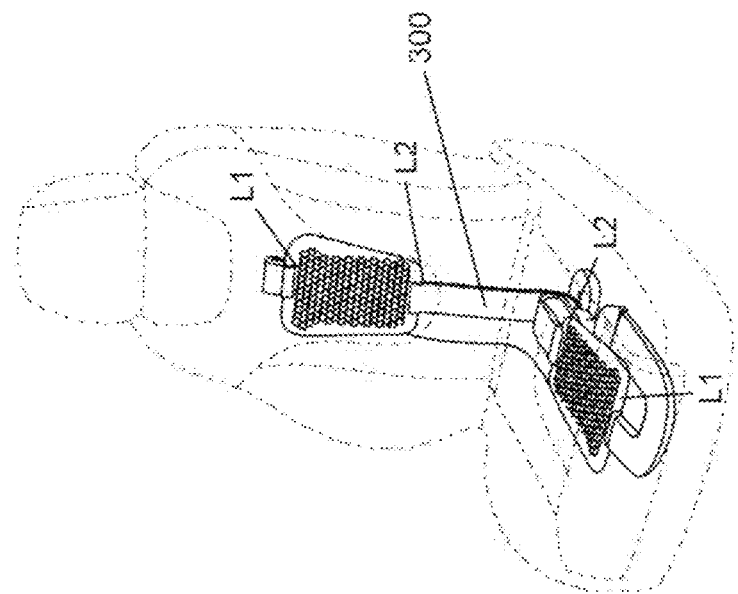
FIG. 1c shows a seat which comprises a temperature management system configured for both a cushion and a backrest of the seat, the temperature management system being constructed according to a third embodiment of the invention.
Figure 1B:
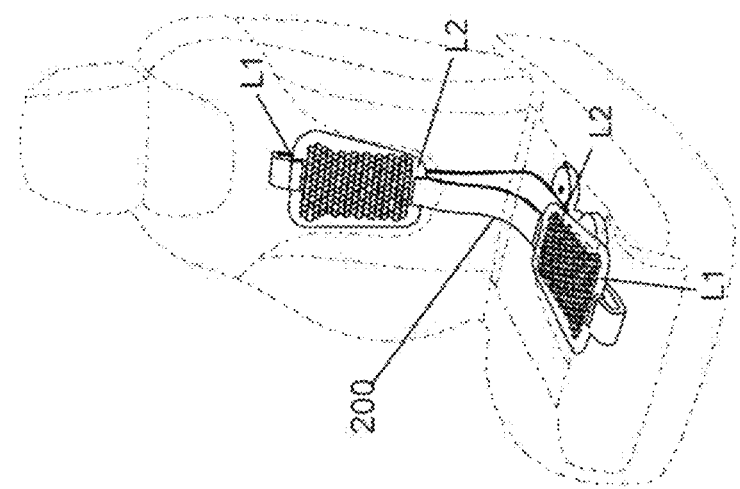
FIG. 1b shows a seat which comprises a temperature management system configured for both a cushion and a backrest of the seat, the temperature management system being constructed according to a second embodiment of the invention.
Figure 1A:
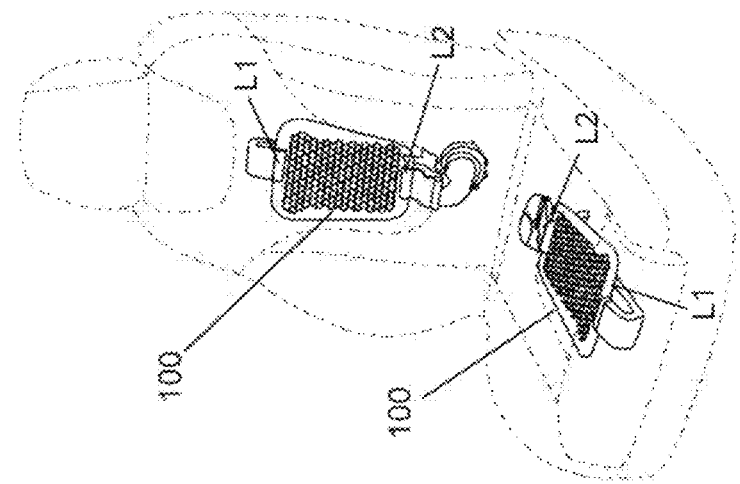
FIG. 1a shows a seat which comprises two temperature management systems configured for a cushion and a backrest of the seat, respectively, the temperature management system being constructed according to a first embodiment of the invention.

FIGS. 1a to 1c are schematic views of a temperature management system for a seat according to first to third embodiments of the invention.

In the first embodiment shown in FIG. 1a, a seat (shown in dashed lines) is configured with two separate temperature management systems 100, one in a cushion of the seat and the other in a backrest of the seat. The two separate temperature management systems 100 have substantially the same structure and each comprise respective air distributing layers, respective power devices, respective temperature adjusting devices and corresponding connecting ducts, etc.

In the second and third embodiments shown in FIG. 1b and FIG. 1c, a seat (shown in dotted lines) is equipped with a single temperature management system 200 and 300. Different from the temperature management system 100 as above, the temperature management system 200 comprises two air distributing layers connected with each other in series; and the temperature management system 300 comprises two air distributing layers connected with each other in parallel. Each air distributing layer defines opposite ends L1 and L2 in a longitudinal direction and opposite ends W1 and W2 in a transverse direction.

Description of the temperature management system according to the invention will be provided with reference to FIGS. 2 to 4a.

Figure 2A:
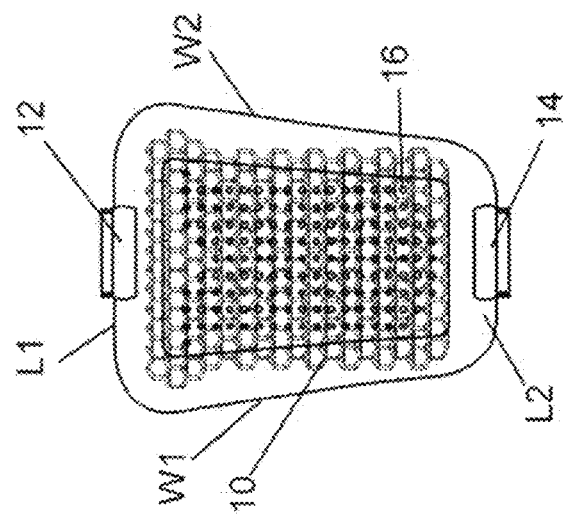
FIG. 2a is a schematic view of the air distributing layer of the temperature management system of FIG. 2.
Figure 2:
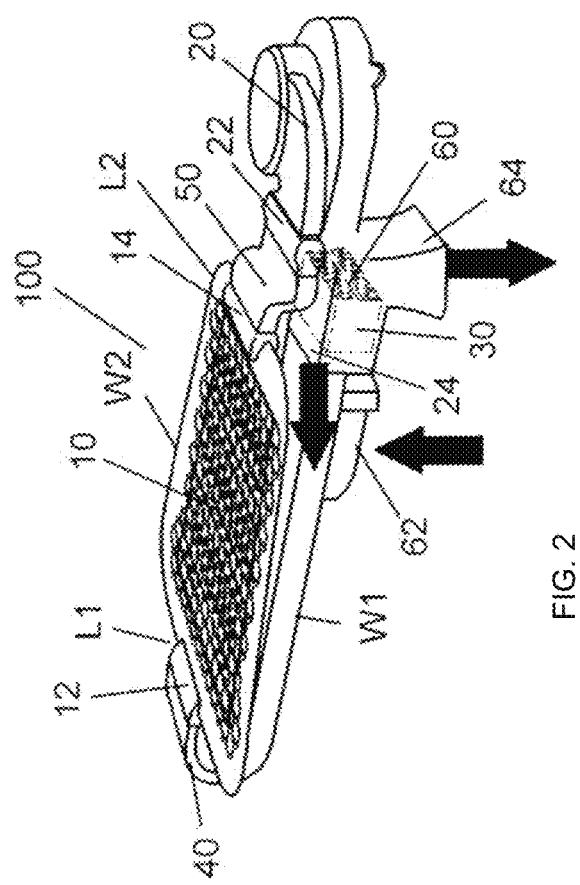
FIG. 2 is a perspective view of the temperature management system constructed according to the first embodiment of the invention with only one air distributing layer.
Figure 2B:
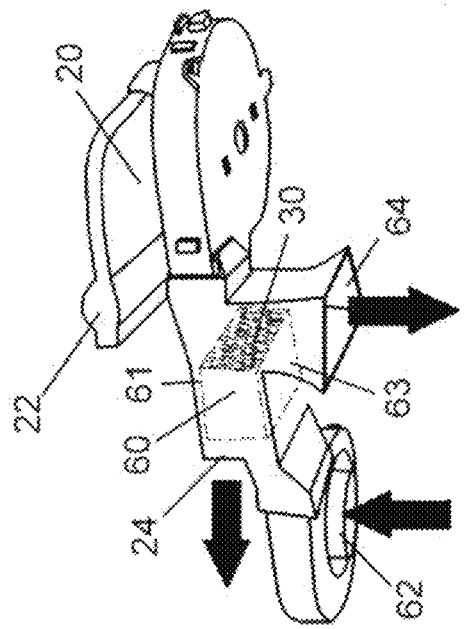
FIG. 2b is another perspective view of the temperature management system of FIG. 2 with the air distributing layer and air ducts removed.

Initially, in FIGS. 2, 2a and 2b, the temperature management system 100 according to the first embodiment of the invention is shown.

The temperature management system 100 comprises an air distributing layer 10 having an air inlet 12 and an air outlet 14; a power device 20 (also referred to as "main power device 20") having an air inlet 22 and an air outlet 24, the power device 20 being configured for driving air in the temperature management system 100 to circulate therewithin; and a temperature adjusting device 30 (a box shown by dotted lines) at the air outlet 24 of the power device 20, the temperature adjusting device 30 being configured for heating/cooling the airflow circulating in the temperature management system 100.

The temperature management system 100 further comprises an inlet duct 40 which is configured for communicating the air inlet 12 of the air distributing layer 10 with the air outlet 24 of the power device 20 so as to lead the air heated/cooled by the temperature adjusting device 30 to the air distributing layer 10, and outlet duct 50 which is configured for communicating the air outlet 14 of the air distributing layer 10 with the air inlet 22 of the power device 20 so that the air out of the air distributing layer 10 can return back to the power device 20. A horizontal arrow in FIGS. 2 and 2b indicates that the airflows out of the air outlet 24 of the power device 20.

Thus, the air distributing layer 10, the outlet duct 50, the power device 20, the inlet duct 40, and the air distributing layer 10 constitute the air-circulating circuit of the temperature management system 100 according to the invention.

FIG. 2a shows the air distributing layer 10 having the air inlet 12 and the air outlet 14; and FIG. 2b shows the temperature management system 100, with the air distributing layer 10, the inlet duct 40 and the outlet duct 50 removed.

In the illustrated embodiment, the air distributing layer 10 is communicated with other devices via ducts, such as the inlet duct 40 and the outlet duct 50. However, the temperature management system 100 may not comprise the air-circulating ducts in view of actual space demands and operation convenience. For example, the air distributing layer 10 and the power device 20 can be communicated with each other directly or by means of other intermediate components such as connectors. Similarly, other air-circulating ducts can be omitted.

According to the invention, the air distributing layer 10 of the temperature management system 100 can be a mattress, a cushion or a backrest made of a form or similar material. The air distributing layer 10 has a bag shape as a whole.

In the illustrated embodiment, the air distributing layer 10 is formed at a side approximate to the occupant with a plurality of small air holes 16 (FIG. 2a). The provision of the air holes 16 causes a tiny amount of air to escape out of the air-circulating circuit and thus the space near the corresponding side of the seat can be heated or cooled rapidly to warn/cool the occupant in a shorter time. The comfortableness of the occupant is thus improved. During the air escaping out of the air-circulating circuit, a slight amount of outside air may be sucked into the circuit of the temperature management system 100. However, the slight air-exchange will not significantly influence the heating/cooling speed or effect of the temperature management system 100. The temperature management system 100 comprising the air distributing layer with the small air holes is a semi closed-loop temperature management system and the air-circulating circuit in the semi closed-loop temperature management system is called a semi closed-loop air-circulating circuit. In alternative embodiments not shown, the semi closed-loop temperature management system may further comprise small air holes in the outlet duct 50 for air-exchanging with outside.

However, it should be understood by the skilled in the art that it is not necessary to provide the small air holes 16 in the air distributing layer 10. In embodiments not shown, the air distributing layer 10 is hermetical except at the air inlet 12 and the air outlet 14, and the entire air-circulating circuit of the temperature management system is isolated from outside with no air-exchange with outside, so as to form a closed-loop air-circulating circuit. In this way, the temperature management system 100 is a closed-loop temperature management system.

According to the invention, the power device 20 of the temperature management system 100 can be configured as any device which can drive air to circulate within the circuit, such as a fan and a blower, etc.

According to the invention, the temperature adjusting device 30 of the temperature management system 100 can be configured as any device which can heat/cool the air in the temperature management system 100. For example, in the illustrated embodiment, the temperature adjusting device 30 is a thermoelectrical device (TED) 60.

In a case that, in winter, the air in the temperature management system 100 and the occupant seating on the seat need to be warmed, the thermoelectrical device 60 is energized with an upper side 61 radiating heat as a warm side and a lower side absorbing heat as a cold side; and in a case that, in summer, the air in the temperature management system 100 and the occupant seating on the seat need to be cooled, the thermoelectrical device 60 is energized with an upper side 61 absorbing heat as a cold side and a lower side radiating heat as a warm side.

With the thermoelectrical device 60 as the temperature adjusting device 30 of the temperature management system 100, the thermoelectrical device 60 itself also needs to be cooled through ventilation.

Accordingly, the temperature management system 100 according to the invention further comprises a ventilation circuit for the thermoelectrical device 60.

The ventilation circuit for the thermoelectrical device 60 comprises an air inlet 62 and an air outlet 64 which are provided at the side of the seat away from the occupant. Air from outside enters into the seat via the air inlet 62 (indicated by an arrow pointing upwards in FIGS. 2 and 2b), passes through and cools the thermoelectrical device 60, and leaves the seat via the air outlet 64 (indicated by an arrow pointing downwards in FIGS. 2 and 2b).

Optionally, the ventilation circuit for the thermoelectrical device 60 may further comprise a separate power device, such as a fan or a blower (not shown in FIGS. 1 to 4a).

According to the invention, the inlet duct 40 and the outlet duct 50 of the temperature management system 100 can be a plastic hose such as a PU hose as known in the art or has any other suitable structure.

The temperature management system 100 as described above according to the first embodiment of the invention merely comprises a single air distributing layer 10, and the air distributing layer 10 can be the cushion or backrest of the seat. As can be known from the above, air within the air-circulating circuit of temperature management system 100 has no air-exchange or a slight air-exchange with outside. With this structure, the cushion can be heated/cooled rapidly and the occupant can be warmed/cooled rapidly, leading to a better warming/cooling effect.

However, when the temperature management system 100 is provided with only one air distributing layer 10, two temperature management systems 100 should be provided for heating/cooling both the cushion and the backrest, as shown in FIG. 1a, including two air distributing layers 10, two power devices 20, two temperature adjusting devices 30, and corresponding ducts. However, it is difficult to locate these components in a limited space in the seat, and the system such constructed has a complicated structure and a high cost.

The above problems are solved with the temperature management systems 200 and 300 according to the second and third embodiments of the invention, details of which will be given in the following with reference to FIGS. 3 and 3a and FIGS. 4 and 4a.

The temperature management system 200 according to the second embodiment of the invention differs from the temperature management system 100 in that the temperature management system 200 comprises two air distributing layers 10a and 10b which are communicated with each other in series and are configured for the backrest and the cushion of the seat respectively. Accordingly, the air distributing layers 10a and 10b each comprise air inlets 12a and 12b and air outlets 14a and 14b.

An air-circulating circuit of the temperature management system 200 is constituted by the air distributing layer 10a, an intermediate duct 70 communicating the air outlet 14a of the air distributing layer 10a with the air inlet 12b of the air distributing layer 10b, the air distributing layer 10b, the outlet duct 50 communicating the air outlet 14b of the air distributing layer 10b with the air inlet 22 of the power device 20, the power device 20, and the inlet duct 40 communicating the air outlet 24 of the power device 20 with the air inlet 12a of the air distributing layer 10a.

In this air-circulating circuit, the air, which has been temperature adjusted, flows out of the air outlet 24 of the power device 20, flows into the air distributing layer 10a via the inlet duct 40 and the air inlet 12a of the air distributing layer 10a, flows into the air distributing layer 10b via the air outlet 14a of the air distributing layer 10a, the middle duct 70 and the air inlet 12b of the air distributing layer 10b, and returns back to the power device 20 via the air outlet 14b of the air distributing layer 10b, the outlet duct 50 and the air inlet 22 of the power device 20.

FIGS. 4 and 4a show the temperature management system 300 according to the third embodiment of the invention. The temperature management system 300 of the third embodiment and the temperature management system 200 of the second embodiment both comprise two air distributing layers, one 10a for the backrest of the seat and the other 10b for the cushion of the seat. Also, the two air distributing layers 10a and 10b share a single power device 20 and a single temperature adjusting device 30.

The temperature management system 300 of the third embodiment differs from the temperature management system 200 of the second embodiment in the connecting manner of the two air distributing layers 10a and 10b.

In particular, in the air-circulating circuit of the temperature management system 300, the airflow, which has been temperature adjusted, flows out of the power device 20 through first and second air outlets 24a and 24b of the power device 20 in parallel as first and second air branches, and both branches return back to the power device 20. The first airflow branch flowing out of the first air outlet 24a enters the air distributing layer 10a via an inlet duct 40a which communicates the first air outlet 24a with the air inlet 12a of the air distributing layer 10a, and returns back to the power device 20 via a first outlet duct 50a which communicates the air outlet 14a of the air distributing layer 10a with the air inlet of the power device 20. The second airflow branch flowing out of the second air outlet 24b enters the air distributing layer 10b via an inlet duct 40b which communicates the second air outlet 24b with the air inlet 12b of the air distributing layer 10b, and returns back to the power device 20 via a second outlet duct 50b which communicates the air outlet 14b of the air distributing layer 10b with the air inlet of the power device 20.

Optionally, the power device 20 can be formed with two separate air inlets respectively for the first and second outlet ducts 50a and 50b so that the first and the second airflow branches flow into the power device 20 independently and in parallel. Alternatively, the power device 20 can also be provided with one single air inlet 22, the first and second outlet ducts 50a and 50b being communicated into one single intermediate outlet duct before communicated into the single air inlet 22 of the power device 20 so that the first and second airflow branches form a total airflow and then return to the single air inlet 22 of the power device 20.

Within the bag-shaped air distributing layer 10 is provided with any suitable air distributing structure, such as in the form of a mesh-shaped air-circulating path, in the form of a serpentine air-circulating path, or in the form of a layered air-circulating path, etc., in order to obtain different air-circulating paths of the airflow within the cushion or the backrest, to improve the comfortableness of the occupant, and to obtain optimal heating/cooling effect.

In the illustrated embodiments of FIGS. 1a to 4a, the air inlet and the air outlet of the air distributing layer are located at opposite ends L1 and L2 in the longitudinal direction of the corresponding air distributing layer. An example of the air distributing layer is shown in FIG. 5a.

Figure 5A:
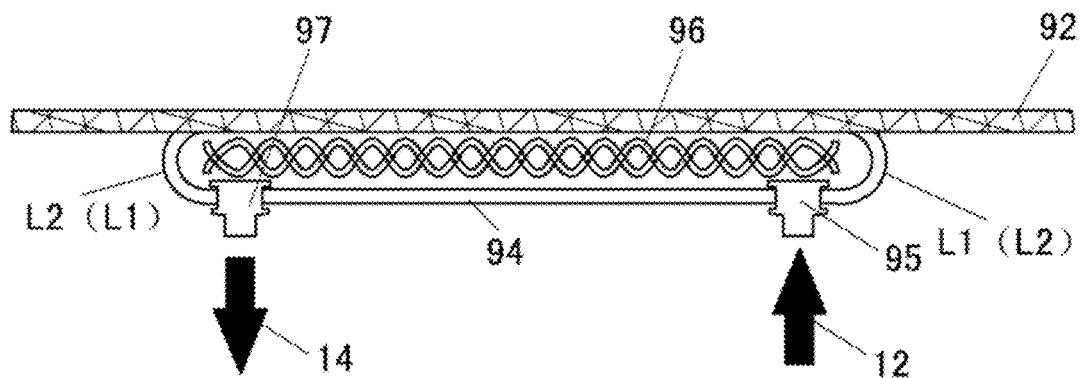
FIG. 5a shows an embodiment of an air distributing layer used in the temperature management systems of FIGS. 1a to 4a, wherein an air inlet and an air outlet of the air distributing layer are located at opposite ends of the air distributing layer in a longitudinal direction.

In FIG. 5a, an exemplary air distributing layer is in the form of a bag, an upper side 92 of which faces the occupant and can be provided with a mat in direct contact with the occupant, or alternatively, can be attached to another mat, such as leather, which is in direct contact with the occupant. The air distributing layer comprises other surface materials 94 forming the bag-shaped air distributing layer; an inlet connector 94 at the air inlet 12 (either 12a or 12b) and an outlet connector 97 at the air outlet 14 (either 14a or 14b); and a spacer 96 within the bag-shaped air distributing layer. In FIG. 5a, the spacer 96 can be made of any suitable spacer material which can lead the air from the air inlet at one end in the longitudinal direction to the air outlet at another end in the longitudinal direction (as indicated by arrows in FIG. 5a). Preferably, the air inlet and the air outlet of the air distributing layer are located in a middle portion of the air distributing layer.

However, according to the principle of the invention, the air inlet and the air outlet of the air distributing layer can be located at the same end in the longitudinal direction of the corresponding air distributing layer. An example of such air distributing layer is shown in FIGS. 5b and FIG. 5c.

Figure 5B:
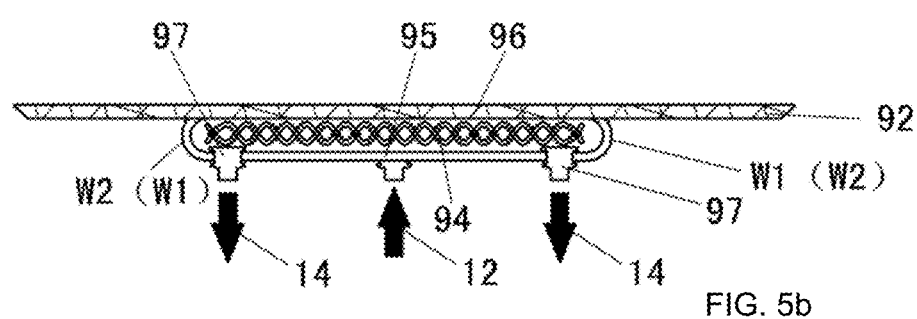
FIG. 5b and FIG. 5c show an embodiment of an air distributing layer in which its air inlet and air outlet are located at the same end of the air distributing layer in a longitudinal direction.
Figure 5C:
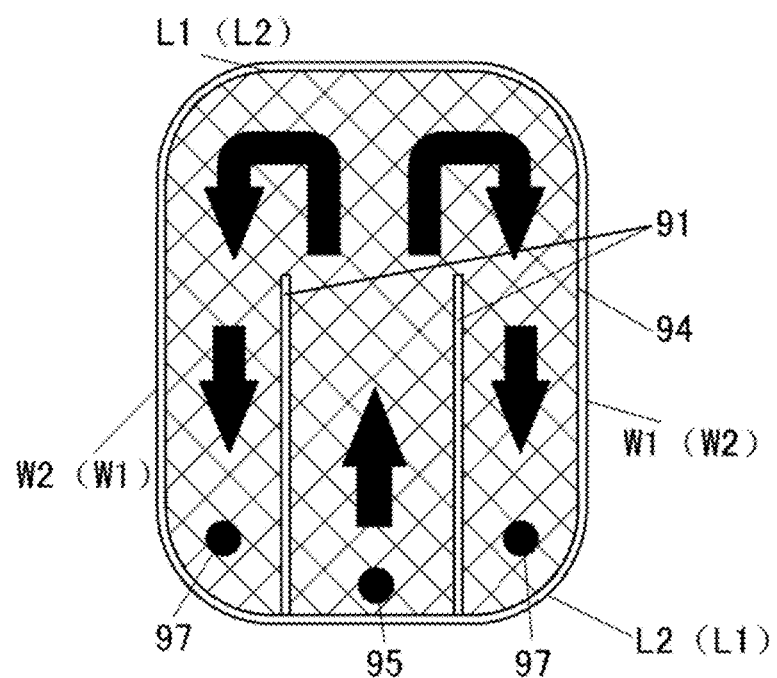

Different from FIG. 5a, the air inlet and the air outlet of the air distributing layer shown in FIGS. 5b and FIG. 5c are located at the same end L1 or L2 in the longitudinal direction of the corresponding air distributing layer. At the longitudinal end, the air inlet and thus the inlet connector 95 can be located substantially in the middle of the air distributing layer in the transverse direction; and two air outlets and thus the outlet connectors 97 can be located at opposite sides of the air distributing layer in the transverse direction. Accordingly, the air distributing layer further comprises two guide elements 91 in the spacer 96 for guiding the air from the air inlet to the two air outlets at the same longitudinal end with the air inlet, as shown in FIGS. 5b and 5c.

Figure 6:
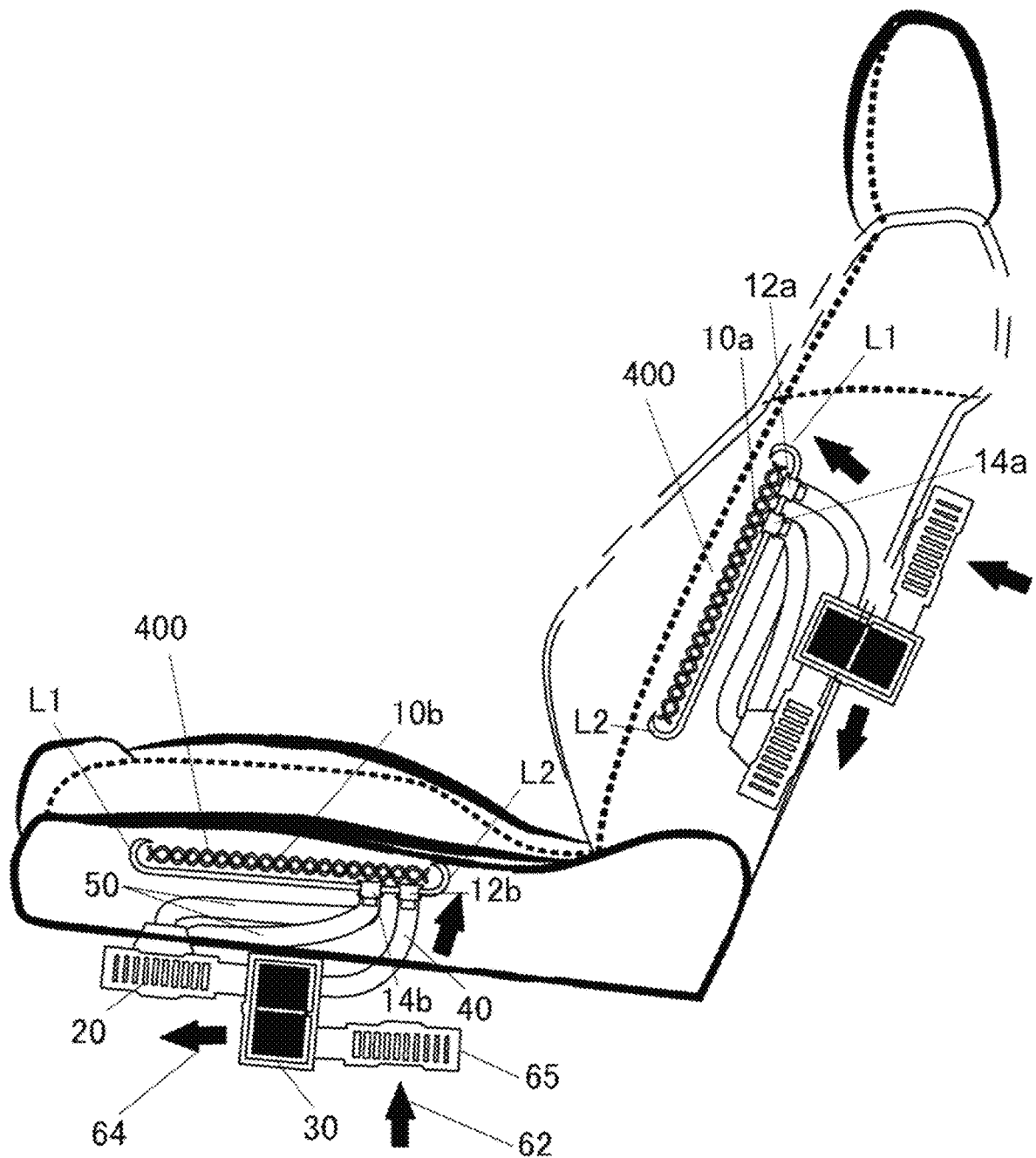
FIGS. 6 to 8 show temperature management systems constructed according to fourth to sixth embodiments of the invention, respectively, the temperature management systems generally corresponding to the first to third embodiments, except comprising the air distributing layers of FIGS. 5b and 5c.
Figure 7:
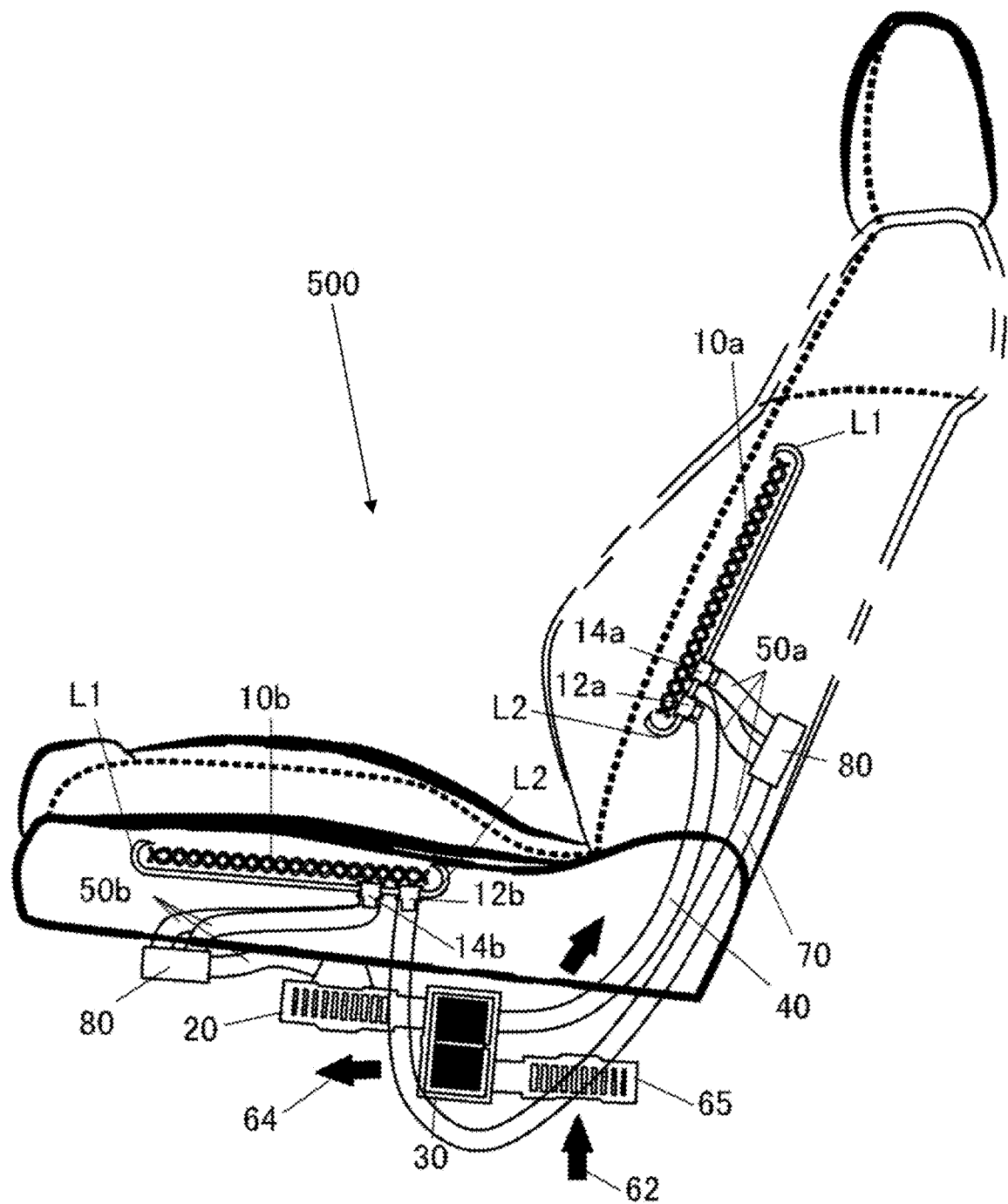
Figure 8:
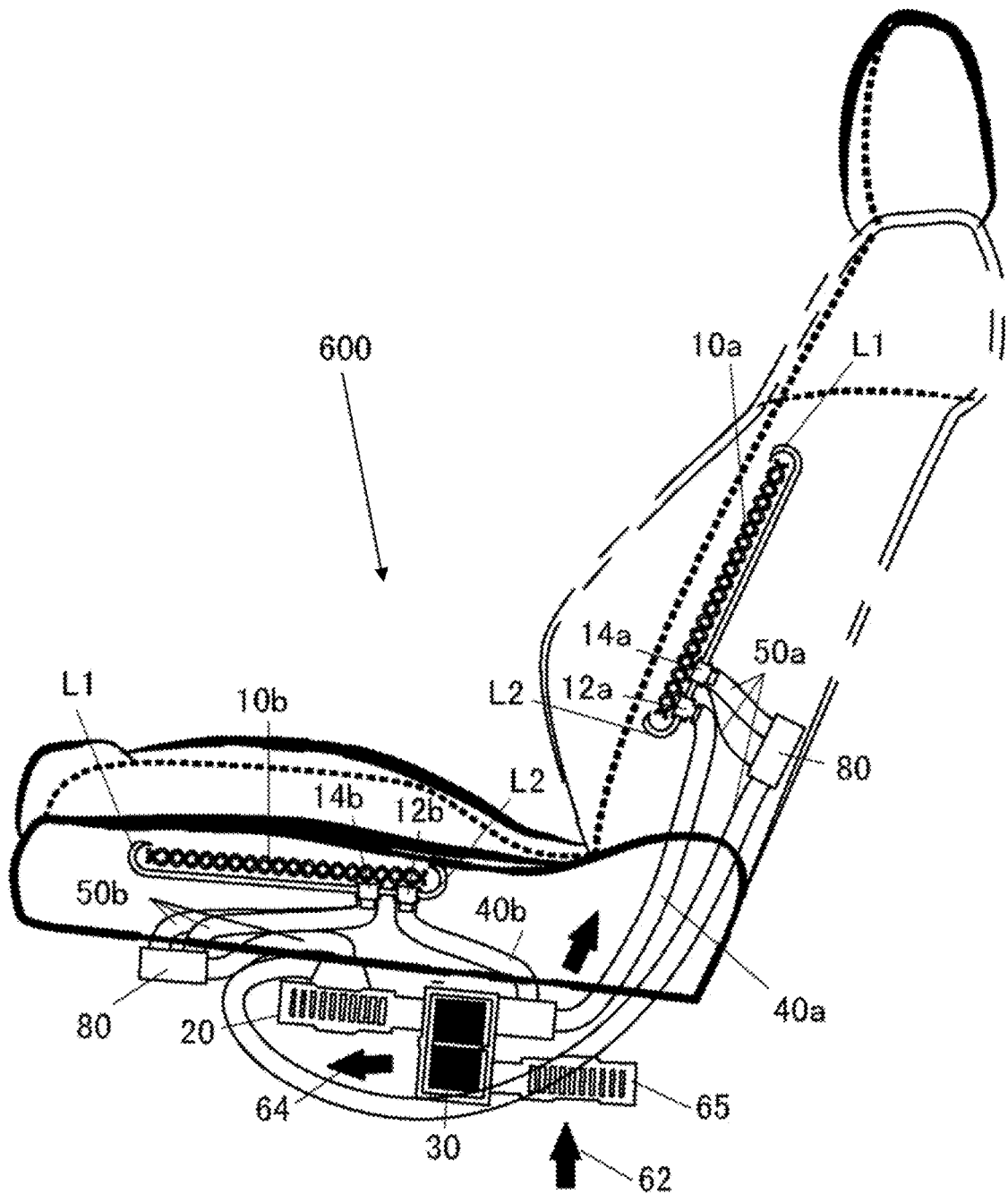

FIGS. 6 to 8 illustrate temperature management systems 400, 500 and 600 corresponding to the temperature management systems 100, 200 and 300 shown in FIGS. 1a to 1c, respectively. Except the reference number of the temperature management system, other elements having the same structure or function as those in FIGS. 1a to 4a are given the same reference numbers.

Different from the temperature management systems 100, 200 and 300 shown in FIG. 1a to 1c, the temperature management systems 400, 500 and 600 shown in FIGS. 6 to 8 comprises air distributing layers constructed according to FIGS. 5b and 5c in which the air outlet and the air inlet are located at the same end of the air distributing layer in the longitudinal direction. Details are shown in FIGS. 6 to 8, in which in the temperature management systems 400, 500 and 600, the air inlets 12a and 12b and the air outlets 14a and 14b of the air distributing layers 10a and 10b are located at the same end L1 or L2 of the corresponding air distributing layer in the longitudinal direction. FIG. 5b is a cross sectional view taken in a plane perpendicular to the longitudinal direction at the air outlet 14 (at the outlet connector 97) of the air distributing layer.

Different from the temperature management systems 100, 200 and 300 shown in FIGS. 1a to 1c, in the temperature management systems 400, 500 and 600 shown in FIGS. 6 to 8, a separate power device 65 is provided for the ventilation circuit for the thermoelectrical device 60, which power device is also called the additional power device. The additional power device 65 and the main power device 20 may have the same or different structures, and for example, both can be configured as a blower or a fan.

In the first and fourth embodiments shown in FIG. 1a, FIGS. 2 to 2b and FIG. 6, the cushion and the backrest of the seat each are provided with respective temperature management systems 100 and 400, each of the temperature management systems for the cushion and the backrest comprising one temperature adjusting device 30 and one power device 65 for the ventilation circuit of the temperature adjusting device 30. In an alternative embodiment, the temperature management systems for the cushion and the backrest each comprise respective temperature adjusting devices 30 such as the thermoelectrical devices 60, but share the same single blower with two air outlets to ventilate both the temperature adjusting device 30 for the cushion and the temperature adjusting device 30 for the backrest. In a further alternative embodiment, in the two temperature management systems configured for the cushion and the backrest, the power device 20 for driving air to circulate in the temperature management system and the power device 65 for the ventilation circuit of the temperature adjusting device 30 are configured as one common power device with at least two air inlets and four air outlets, and in this way, both the temperature management system of the cushion and the temperature management system of the backrest share one single power device such as a blower.

In the temperature management systems of the six embodiments shown in FIGS. 1a to 8, the temperature adjusting device 30 is the thermoelectrical device 60. As an additional or alternative heating element to the thermoelectrical device 60, a flat ventilation layer can be provided beneath the spacer 96, and a flat heating element can be positioned along or within the ventilation layer. The ventilation layer can in the form of a bag. The flat heating element can be at least partially made of textile or printed foil.

When the air distributing layer shown in FIGS. 5b and 5c comprises two air outlets, a connector 80 is provided in FIGS. 7 and 8 for jointing the outlet ducts 50, 50a and 50b to one outlet duct 50, 50a and 50b, although such a connector is not always necessary as can be understood by the skilled in the art.

In the previous embodiments, the temperature management system comprises the air distributing layer, and the airflow, which has been temperature adjusted by the temperature adjusting device, passes through the air distributing layer and then returns back to the power device, then is heated/cooled by the temperature adjusting device again, and thus is circulated in the air-circulating circuit as such, achieving the purpose of warming or cooling the space around the seat. There is no need to exchange air for the airflow in the temperature management system with outside or only a slight air-exchange exists, and a rapid warming or cooling function and a better warming or cooling effect are achieved.

According to the principle of the invention, the airflow, which has been temperature adjusted by the temperature adjusting device and which flows out of the power device, entirely flows into the air distributing layer, and partially or entirely returns back to the power device afterwards? However, it is also conceived that, in some applications, a portion of the airflow, which has been temperature adjusted by the temperature adjusting device and which flows out of the power device, can directly returns back to the air inlet of the power device, and the airflow flowing into the air distributing layer can partially returns back to, or will not return back to, the power device. The temperature management systems constructed as such fall within the scope of the invention.

According to the application, the cushion may comprise the temperature management system according to the first or fourth embodiment; and the backrest also may comprise the temperature management system according to the first or fourth embodiment.

According to the application, an occupant supporting device may comprise one or both of the cushion and the backrest as above. The main power device and the additional power device of either the cushion or the backrest can be configured as a single common power device with two air inlets and two air outlets. In case that the occupant supporting device comprises both the cushion and the backrest, the additional power device for the cushion and the additional power device for the backrest can be configured as a single common power device with at least two air outlets, or the main power device and the additional power device of the cushion as well as the main power device and the additional power device of the backrest can be configured as a single common power device with at least two air inlets and four air outlets.

In addition, the occupant supporting device according to the application can also be configured as comprising the cushion constructed as above and a backrest with an open temperature management system. The open temperature management system for the backrest comprises an air distributing layer and a power device for supplying ambient air into an air inlet of the air distributing layer, the air distributing layer comprising an air outlet open to outside.

As described above, in the embodiment of the air distributing layer shown in FIGS. 5a and 5b, the upper side 92 of the air distributing layer can be a PU layer which is in contact with a mat directly contacting an occupant or can be a mat which is in direct contact with the occupant. The former structure is used in most applications, and an example of the latter structure is shown in FIG. 9.

Figure 9:
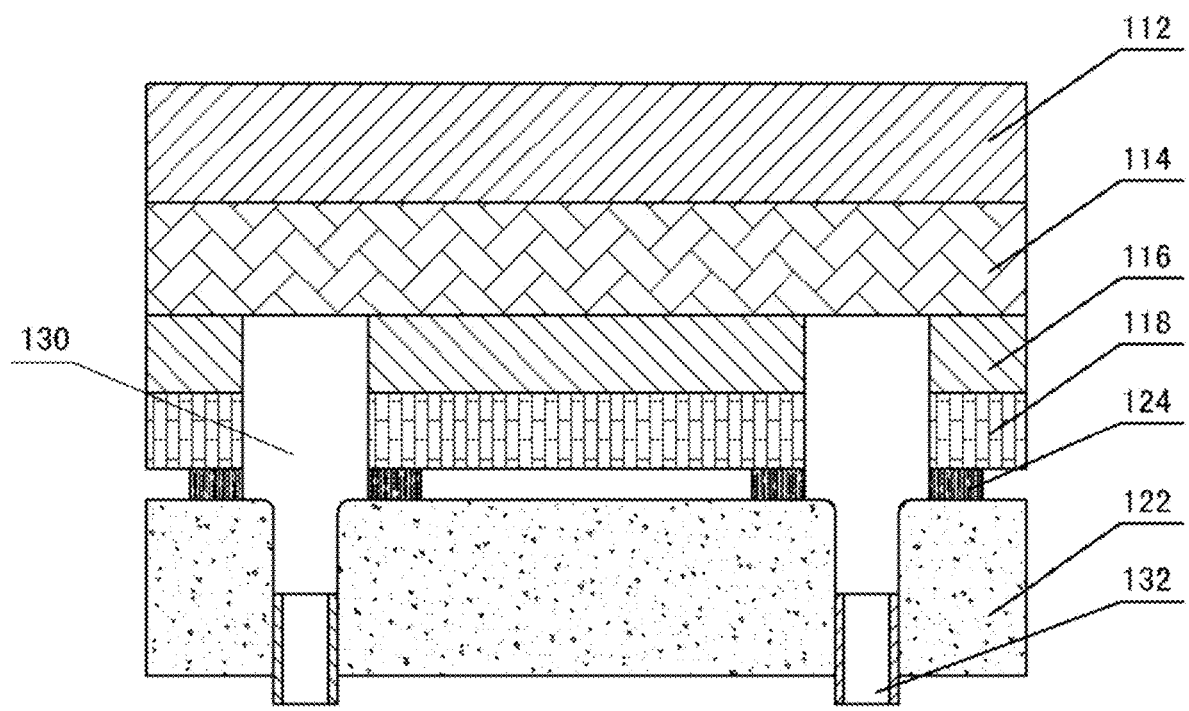
FIG. 9 shows a preferred embodiment of an air distributing device which can be used in a temperature management system of the invention.

In FIG. 9, the air distributing layer comprises a mat layer 112 in direct contact with the occupant which can be a seat surface leather; a spacer layer 114 which corresponds to the spacer 96 in FIGS. 5a and 5b; a heater layer 116; and a bottom PU layer 118. In stead of providing a top PU layer for the air distributing layer as usual, the spacer layer 114 is in direct contact with the seat surface leather. This achieves a shortest effective heat exchange path and a rapid heating/cooling speed to the space around the seat and thus a better heating/cooling effect. The spacer layer 114, the heater layer 116 and the bottom PU layer 118 can be sewed to the seat surface leather in a hermetic manner.

Also described as above, the air ducts in the temperature management system, such as the inlet duct 40 and the outlet duct 50, can be omitted, an example of which is shown in FIG. 9 as well.

As can be seen in FIG. 9, the air distributing layer is communicated with the temperature adjusting device under it (not shown) such as the TED and the main power device (not shown) such as a blower via an air passage 130 penetrating through a foam layer 122 of the seat. The fact that the air ducts extend beyond the extension of the air distributing layer, as shown in FIGS. 1a to 4a, are avoided. This reduces the number of the components required and simplifies the structure of the temperature management system, shortens the heat exchange path and improves the heat exchange effect.

In particular, the air passage 130 penetrates through the heater layer 116 and the bottom PU layer 118 of the air distributing layer and the foam layer 122 and forms the shortest air path through which air which has been temperature adjusted and which flows out of the main power device flows directly to the spacer layer 114 of the air distributing layer.

Preferably, a seal 124 with adhesive at its opposite sides is provided between and is adhered to the air distributing layer and the foam layer 122 in order to ensure a sealing effect therebetween. Apparently, reliable sealing should be ensured among different components of the closed loop or semi-closed loop air circulating circuit.

Further preferably, an air duct 132 such as a plastic duct or a hose can be inserted into the air passage 130 so that air can flow through the air passage 130 easier. An interfere fit can be formed between the air duct 132 and the passage wall of around it.

FIG. 10 shows a further preferred embodiment of the invention.

The embodiment shown in FIG. 10 is generally similar to that in FIG. 1a. A cushion and a backrest of a seat each are equipped with one respective temperature management system 100 having a closed loop air circulating circuit or a semi-closed loop air circulating circuit. Each temperature management system 100 comprises one air distributing device 10; a temperature adjusting device 30 such as the same temperature adjusting device 30 as described above; and a main power device 20 such as the same main power device 20 as described above.

The embodiment shown in FIG. 10 differs from that in FIG. 1a in that the connecting manner of the air distributing device 10 and the temperature adjusting device 30 as well as the main power device 20, in that the structure of the air distributing device 10, and in that the arrangement of additional power devices for the temperature adjusting devices 30 of the temperature management systems 100.

For each temperature management system 100 in FIG. 10, the air distributing device 10 is communicated with the temperature adjusting device 30 and the main power device 20 via an air passage penetrating through a foam layer (not shown) of the seat, which avoids the arrangement of air ducts (the inlet duct 40 and the outlet duct 50) which extend beyond the extension of the air distributing device 10. Alternatively, a separate air duct 140 can be provided within the air passage, as described with reference to FIG. 9.

The air distributing device 10 in FIG. 10 has the same structure as described with reference to FIG. 9. A seat surface leather is provided as a surface of air distributing device 10 for directly contacting the passenger and is directly engaged and sealed with a spacer layer of the air distributing device 10.

Preferably, in the embodiment in FIG. 10, a ventilation path which is configured for the temperature adjusting device (thermoelectrical device) 30 of the temperature management system 100 of the cushion and a ventilation path which is configured for the temperature adjusting device (thermoelectrical device) 30 of the temperature management system 100 of the backrest are provided with a single common additional power device 90. The single common additional power device 90 has a single air inlet for environmental air entry and two air outlets for respective temperature management system 100. This reduces the number of the additional power devices such as blowers and thus reduces the associated cost.

According to the invention, the air distributing device of the temperature management system itself forms a closed fluid loop or a semi-closed fluid loop in which the side of the air distributing device is formed with the small air holes. An airflow, which flows out of the main power device and which has been temperature adjusted by the temperature adjusting device, flows into the air distributing device and returns back to the main power device after circulating within the air-circulating circuit, and wherein the airflow which has returned back to the main power device will be adjusted by the temperature adjusting device and circulated in the air-circulating circuit again. In addition, the temperature management system further comprises an additional power device, which is installed for providing an auxiliary second air stream along the temperature adjusting device outside of the closed loop, so that the auxiliary air stream allows the temperature adjusting device to work as a heat pump, which transfers heat from the closed fluid loop towards the auxiliary air stream or vice versa.

While description has been provided with reference to the preferred embodiments of the temperature management system, the above description is not intended to limit the protecting scope of the invention which is only defined by the attached claims. All modifications or changes to the structures, forms, features and other details described as above without departing from the spirit and scope of the invention are intended to be covered by the invention.

The invention claimed is:

1. A temperature management system for an occupant supporting device comprising:
 an air distributing device having a body structure, in a form of a bag having a separate spacer disposed therein, extending between opposing ends along a longitudinal axis, the air distributing device having an air inlet, a first air outlet, and a second air outlet, all three of which are located adjacent to one another at one of the opposing ends of the body structure; wherein the body structure has an upper side facing an occupant and a lower side in opposition to the upper side, the upper side and the lower side disposed along a transverse axis, the air inlet, the first air outlet, and the second air outlet being located on the lower side; wherein the air distributing device comprises two guide elements formed in the spacer for guiding the airflow from the air inlet to the first air outlet and the second air outlet;

a main power device having an air outlet connected to the air inlet of the air distributing device with an inlet duct, the main power device having an air inlet connected to the first air outlet and the second air outlet of the air distributing device with an outlet duct, the main power device circulating air through an air-circulating circuit within the air distribution device; and a temperature adjusting device for adjusting a temperature of the air in the air-circulating circuit, wherein an airflow, which has been temperature adjusted by the temperature adjusting device and which flows out of the air outlet of main power device, comprises at least a first portion of the air flow which flows through the inlet duct and into the air inlet of the air distributing device and a second portion of the airflow which returns back to the air inlet of the main power device through the outlet duct after circulating within the air-circulating circuit, and wherein the airflow which has returned back to the main power device is further adjusted by the temperature adjusting device and re-circulated in the air-circulating circuit; and wherein the airflow flows from the air inlet along a central longitudinal axis toward one of the opposing ends and then turns and flows in an opposite direction along opposing edges of the air distributing device to the first air outlet and the second air outlet.

2. The temperature management system of claim 1, wherein the first portion of the airflow which flows into the air distributing device, partially or entirely, will not return back to the main power device.

3. The temperature management system of claim 2, wherein the second portion of the airflow which flows out of the air outlet of the main power device directly returns back to the air inlet of the main power device.

4. The temperature management system of claim 1, wherein the first portion of the airflow comprises an entirety of the airflow which has been temperature adjusted by the temperature adjusting device and which flows out of the main power device, the second portion of the airflow is a portion of or an entirety of the first portion of the airflow, and at least a portion of or an entirety of the airflow flowing out of the air distributing device returns back to the main power device.

5. The temperature management system of claim 1, wherein the air distributing device comprises air holes at the upper side proximate to the occupant seating on the occupant supporting device, the air holes being in communication with outside air.

6. The temperature management system of claim 1, wherein the outlet duct communicating the air distributing device with the main power device comprises air holes for allowing the airflow within the air-circulating circuit to be exchanged with outside air.

7. The temperature management system of claim 1, wherein the temperature adjusting device is provided at the first air outlet and/or the second air outlet of the main power device, and the airflow in the temperature management system flows out of the main power device after the temperature of the airflow has been adjusted, and wherein the temperature adjusting device is a thermoelectrical device.

8. The temperature management system of claim 7, further comprising a ventilation path for the thermoelectrical device, wherein the ventilation path comprises an air inlet and an air outlet which are provided at the lower side of the air distributing device away from an occupant seating on the occupant supporting device and which are in communication with outside air, and the ventilation path further comprises an additional power device.

9. The temperature management system of claim 8, wherein the main power device and the additional power device are separate power devices which have the same or different structure.

10. The temperature management system of claim 8, wherein the main power device and the additional power device are provided by a single common power device with two air inlets and two air outlets.

11. The temperature management system of claim 1, wherein the upper side of the air distributing device facing towards the occupant seated on the occupant supporting device is attached to a mat which is in direct contact with the occupant.

12. The temperature management system of claim 1, wherein the upper side of the air distributing device facing towards the occupant seated on the occupant supporting device is configured as a mat layer which is in direct contact with the occupant.

13. The temperature management system of claim 12, wherein the air distributing device further comprises a spacer layer in direct contact with the mat layer, a heater layer in direct contact with the spacer layer, and a bottom PU layer in direct contact with the heater layer.

14. The temperature management system of claim 13, wherein the spacer layer, the heater layer, and the bottom PU layer are sewn to the mat layer in a hermetic manner; the bottom PU layer is hermetically engaged to a foam layer of the occupant supporting device; and the bottom PU layer is hermetically engaged to the foam layer by means of a seal with adhesive at opposite sides of the seal.

15. The temperature management system of claim 1, wherein the air distributing device comprises first and second air distributing devices, and wherein the first portion of the air flow flows into the first and second air distributing devices from the main power device and returns back to the main power device after flowing out of the first and second air distributing devices.

16. The temperature management system of claim 15, wherein the second air distributing device is connected with the first air distributing device in series, and wherein the first portion flows into the first air distributing device from the main power device, the airflow flowing out of the first air distributing device flows into the second air distributing device, and the airflow flowing out of the second air distributing device returns back to the main power device.

17. The temperature management system of claim 15, wherein the second air distributing device is connected with the first air distributing device in parallel, and wherein the first portion flows into the first and second air distributing devices at the same time from the main power device, and the airflow flowing out of both the first and second air distributing devices directly returns back to the main power device.

18. The temperature management system of claim 17, wherein a first outlet duct from an air outlet of the first air distributing device and a second outlet duct from an air outlet of the second air distributing device are in direct communication with the main power device independently, or a first outlet duct from an air outlet of the first air distributing device and a second outlet duct from an air outlet of the second air distributing device are integrated into a single overall outlet duct which is in direct communication with the main power device.

19. The temperature management system of claim 1, further comprising a ventilation path for the temperature adjusting device, wherein the ventilation path comprises an air inlet and an air outlet which are provided at the lower side of the air distributing device away from the occupant seated on the occupant supporting device.

20. The temperature management system of claim 1, wherein the air inlet is located in between the first air outlet and the second air outlet.

21. The temperature management system of claim 1, wherein the two guide elements extend, from proximate to one of the opposing ends, along the longitudinal axis of the air distributing device that includes the air inlet towards the other of the opposing ends.

22. The temperature management system of claim 21, wherein the two guide elements are free from extending all the way to the other of the opposing ends of the air distributing device.

23. The temperature management system of claim 16, wherein the temperature management system comprises:
   two first outlet ducts extending from the first air outlet and the second air outlet of the first air distributing device and joining at a first connector;
   a middle duct extending from the first connector to the air inlet of the second air distributing device; and
   two second outlet ducts extending from the first air outlet and the second air outlet of the second air distributing device and joining at a second connector to which the outlet duct connecting to the air inlet of the main power device is attached.

* * * * *